Oct. 26, 1948.  G. V. WOODLING  2,452,276
TUBE FITTING DEVICE
Filed Dec. 22, 1944  2 Sheets-Sheet 1

INVENTOR.
George V. Woodling.

Oct. 26, 1948.  G. V. WOODLING  2,452,276
TUBE FITTING DEVICE
Filed Dec. 22, 1944  2 Sheets-Sheet 2
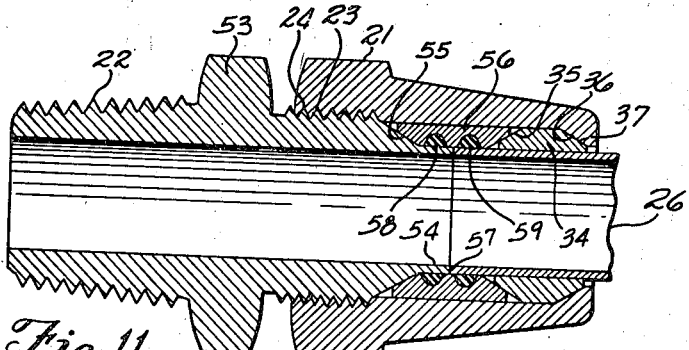
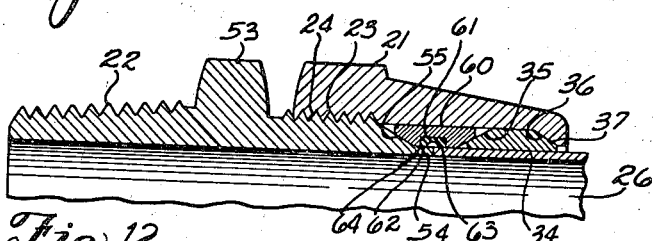
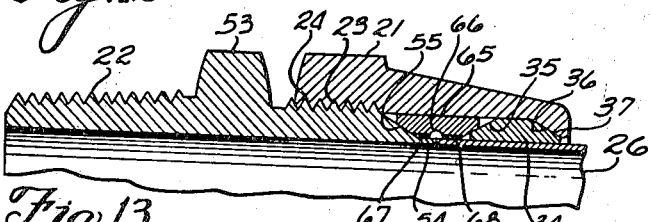
INVENTOR.
George V. Woodling Patented Oct. 26, 1948

2,452,276

UNITED STATES PATENT OFFICE 2,452,276

TUBE FITTING DEVICE

George V. Woodling, Cleveland, Ohio

Application December 22, 1944, Serial No. 569,351

4 Claims. (Cl. 285—122)

My invention relates in general to connecting devices and more particularly to connecting devices for tube fittings.

The invention is not limited to tube fittings, but includes any application where a substantially round element is connected to another element.

An object of my invention is the provision of connecting a substantially round element or tube to a coupling element by employing contractible means for annularly engaging the outer surface of the round element or tube.

Another object of my invention is a provision of a coupling which prevents water or other moisture from entering the assembly or from getting next adjacent to the pipe, thereby eliminating the possibility of the moisture freezing next to the pipe and causing the pipe to be compressed inwardly and rendering the coupling defective.

Another object of my invention is the provision of applying substantially equal pressure to each end of the contractible means or collar, whereby the contractible means or collar is forceably contracted about the pipe in an even manner to give substantially an even distribution of stresses.

Another object of my invention is the provision of a contractible means which functions substantially as a lock washer to prevent the compression nut from becoming loose under vibration.

Another object of my invention is the provision of anchoring a tube to a coupling or fitting element without the employment of a flare on the end of the tube.

Another object of my invention is the provision of a contractible means which is adapted to be contracted about the tube and which constitutes the only means of holding the tube against longitudinal movement relative to the coupling or fitting element.

Another object of my invention is the provision of providing a hardened surface upon the inner surface of the contractible means, the hardened surface comprises hard chromium plated material or frangible material which digs into the tube when the contractible means is contracted about the tube.

Another object of my invention is the provision of an overlapping collar which surrounds the joint between the tube and a cylindrical extension of the fitting element, whereby a seal may be provided on each side of the joint to prevent leakage of fluid pressure.

Another object of my invention is the provision of a seal comprising resilient and deformable material placed next adjacent to the tube and disposed to block fluid pressure escaping from the coupling assembly.

Another object of my invention is the provision of anchoring or connecting a tube to a coupling element whereby the vibration of the tube is absorbed.

Another object of my invention is to control the amount of the contractible movement of the contractible means which engages the tube.

Another object of my invention is to prevent the parts from being assembled in the wrong way.

Other objects and a fuller understanding of my invention may be had by referring to the following description and claims taken in conjunction with the accompanying drawing in which:

Figure 6:
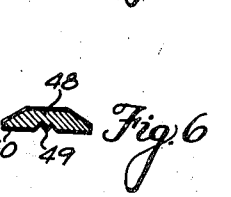

Figure 6 is a cross-sectional view of a modified form of the contractible means or collar, in that the surface is provided with hard chromium plating and in that the central portion of the contractible means or collar is provided with a relatively sharp inwardly extending rib for digging into the tube when the contractible means or split collar is contracted about the tube; and Figures 7 to 13 show modified forms of my coupling or tube fitting devices, all of which employ the contractible means or split collar for holding the tube against longitudinal movement with reference to the coupling element.

Figure 1:
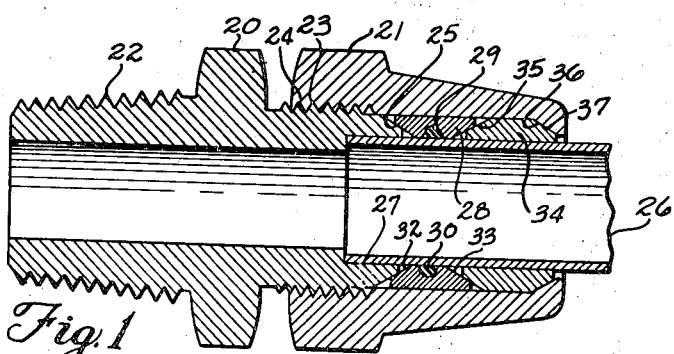
Figure 1 is a longitudinal cross-sectional view of a tube fitting or coupling device embodying the features of my invention.
Figure 2:
Figure 2 is a cross-sectional view of the solid collar shown in Figure 1, and shows the disposition of the resilient and deformable sealing ring before the tube is inserted therein.

With reference to Figure 1 of the drawing, my invention is shown as being applied to a tube fitting or coupling device comprising a coupling element 20, a tube 26 adapted to being connected thereto, and a compression nut 21. The left-hand end of the coupling or fitting element 20 is provided with threads 22 which are usually in the forms of pipe thread for engaging a cylinder or other fluid connecting devices. The right-hand end of the coupling element 20 is provided with male threads 23 to which is threadably attached the compression nut 21 having female threads 24 which threadably engage the male threads 22. The right-hand end of the coupling or fitting element 20 is provided with a bore 27 in which the end of the tube 26 is inserted. In accordance with usual practice, the right-hand end of the coupling or fitting element 20 is provided with a conical abutment end surface 25. As shown in the present drawing, the angle of the conical abutment is in the neighborhood of 37°, but it is to be understood that the angle may be varied to accommodate particular engineering requirements. As illustrated, a solid collar 28 is disposed next adjacent to the coupling or fitting element 20 and is provided with reversible and substantially identical end surfaces 32 and 33, each constituting substantially an internal conical or cam surface with the conical or cam surface 32 engaging the conical abutment end 25 of the coupling or fitting element 20. The solid collar 28 is provided with an internal groove 29 to receive a sealing ring 30 comprising preferably resilient and deformable material of a rubber-like nature. The cross-sectional area of the internal groove 29 is substantially the same as that of the sealing ring 30 so that when the tube 26 is inserted within the solid collar 28, the sealing ring 30 substantially fills the entire space of the internal groove 29 and makes a good sealing engagement with the tube to block fluid pressure from escaping between the inner surface of the solid collar 28 and the tube 26. The view in Figure 2 shows the disposition of the sealing ring 30 within the internal groove 29 before the tube 26 is inserted therethrough.

Figure 3:
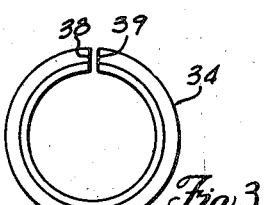
Figure 3 is a front view of the split collar or contractible means of my invention, shown in the uncontractible position.
Figure 4:
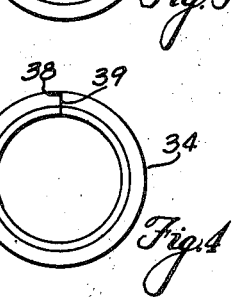
Figure 4 is a view similar to Figure 3, showing the split collar or contractible means in the contractible position.

A contractible means or split collar 34 is adapted to engage the solid collar 28 and be contracted about the tube 26 at a place remote from the end of the tube. The split collar 34 has reversible and substantially identical end surfaces 35 and 36, each constituting substantially an external conical cam surface with the conical or cam surface 35 engaging the internal conical or cam surface 33 of the solid collar 28. The right-hand end of the compression nut 21 is provided with internal conical or cam surface 37 which is adapted to engage the external cam surface 36 of the split collar 34, whereby the split collar 34 is forcibly contracted by wedging or cam pressure upon both ends thereof around the tube 26 to clamp the tube against longitudinal movement with reference to the compression nut 21. The angles of the abutting cam or conical surface are substantially identical on all the parts, being in the neighborhood of 37°, which is less than 45° where the tangent is one, whereby the inward movement is slower than the longitudinal movement. Thus, the engagement between the cam surfaces 36 and 37 function substantially as a good frictional lock washer against the compression nut 21 becoming loose. It is to be noted that the solid and split collars can not be assembled in the wrong way since they are reversible. The split-ends of the split collar 34 are identified by the reference characters 38 and 39, see Figures 3 and 4, and as the compression nut 21 is turned on tighter to the coupling or fitting element 20 the split collar 34 is compressed about the tube 26 until the two split ends 38 and 39 come together as shown in Figure 4, at which time further contraction of the split collar is arrested. The space between the split ends 38 and 39 may be in the neighborhood of thirty to forty-five thousandths of an inch so that when the split collar is completely contracted there is a contraction of the tube in the neighborhood of ten to fifteen thousandths of an inch. I find from tests that the split collar 34 when completely contracted makes a good firm grip with the tube and will withstand a longitudinal pull on a steel tube to the extent of 1000 pounds or more before the tube can be pulled out of the split collar 34. Accordingly, my invention obviates the need of a flare on the end of a tube. The elimination of the flare results in many advantages. One advantage is that no special flaring tools are required in applying my invention to a tube. Another benefit is that the solid collar rests solidly against the coupling or fitting element and thus a good seal therebetween is always maintained. With the flared end of a tube between the solid collar and the coupling or fitting element, there is the possibility of the flare becoming "crushed" or "smashed" when too much torque is applied to the compression nut, in which event a leak may develop. Then too, the "crushing" of the flare enables loose play to develop between the solid collar and the coupling or fitting element, whereby the grip of the split collar may be weakened, with the result the compression nut 21 may become loose. The split collar 34 may no longer function as a locked washer to keep the compression nut 21 from becoming loose, since the solid collar and the split collar may become loose with the "crushing" of the flared end of the tube. In other words, when the flared end of a tube is used, the compression nut 21 is preferably turned down by means of a torque wrench. In my invention the torque wrench may be unnecessary.

The cam or conical pressure incident to the cam pressures is applied upon both ends of the split collar 34 and thus the split collar engages the tube substantially in a parallel surface relationship with respect to each other and thereby gives an even distribution of the compression stresses. In other words, the split collar 34 is not, so to speak, cocked upon the tube so that one end presses harder than the other end. Furthermore, inasmuch as the split ends 38 and 39 are pressed tight against each other for the entire length of the split collar, there is no opportunity for water or other moisture to enter into the space between the collars and the tube, whereby when it once freezes it compresses the tube inwardly and then after it thaws a larger amount of water may enter and then when it freezes again the tube is further compressed in. Under repeated cycles of thawing and freezing, the tube 26 is eventually squeezed flat in those cases where water may enter between the inner surface of the collars and the external surface of the tube 26. In my invention, there is no possibility for water or other moisture to enter, whereby the tube may be damaged as explained above.

Figure 5:
Figure 5 is a cross-sectional view of the split collar or contractible means showing an inner layer of hard or frangible material, which when the contractible means or collar is contracted the material digs into the surface of the tube for making a strong gripping surface therewith.

In the event that the particular application requires a strong holding power, the internal surface of the split collar 41 may be provided with a frangible material indicated by the reference character 31 in Figure 5. The frangible material may comprise a metal or glass spray or enamel coating, or particles of emery adhering to the inside surface of the split collar by suitable binders which may, when the split collar is compressed about the tube breaks up into small particles and digs into the tube for making a good grip therebetween. In Figure 6, I show a modified form of the split collar 48, in that the split collar may be provided with a coating 50 of hard chromium which provides a rough surface for imbedding itself into the tube for giving a strong holding power. Further, I have illustrated an internal sharp rib 49 which when plated with chromium has the property of building up internally so that the internal sharp rib has a smaller diameter than the rest of the surface of the split collar, whereby when the split collar is compressed about the tube the internal sharp rib 49 digs into the tube for holding same against longitudinal movement. On each side of the internal sharp rib 49 is a small groove so that the metal which is displaced by the internal sharp rib may flow into the side grooves.

Before the split collar is chromium plated the internal sharp rib 49 is the same diameter as the rest of the inner surface of the collar, as the bore is made by drilling or reaming a hole therethrough and the sharp rib is made by cutting two shallow side-by-side spaced grooves. In plating the collar the chromium builds up on the sharp edge faster than it does upon the rest of the surface. In this manner the rib is a few thousandths of an inch smaller in diameter than the rest of the inner surface of the split collar. The amount of the build-up of the rib can be controlled by the plating operation. The thickness of the chromium coating 50 and the size of the grooves are exaggerated in the drawing. In practice their dimensions may be only a few thousandths of an inch.

Figure 7:
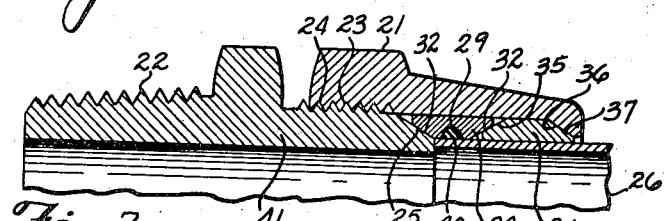

The Figure 7 shows a modified form of the invention, as shown in Figure 1, in that the fitting element 41 does not have a bore to receive the end of the tube. Otherwise, the invention is substantially the same as that shown in Figure 1.

In Figure 7, the fitting element 41 may be of a standard design which is now found upon the market.

Figure 8:
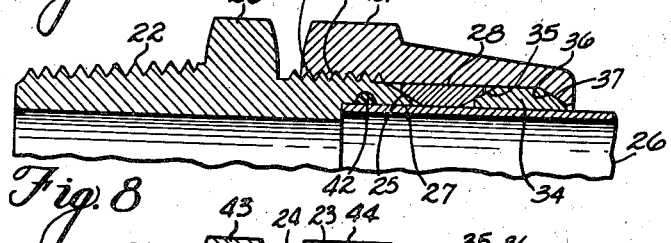

In Figure 8 the fitting element is the same shape as that shown in Figure 1 except that it has a sealing ring 42 provided between the bore and the tube 26. In this arrangement the solid collar does not have a sealing ring provided therein for the reason that the sealing ring 42 takes care of sealing the fluid pressure.

Figure 9:
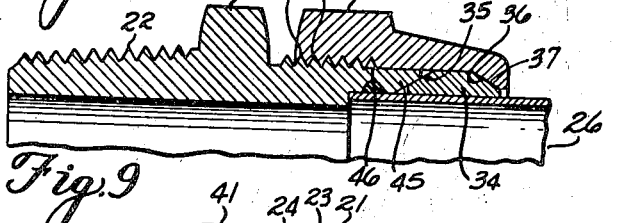

In Figure 9, I show another modified form, in that the coupling or fitting element 43 is provided with a substantially square abutting end against which a modified solid collar 45 abuts. The solid collar 45 has substantially a square end for abutting the fitting element. The square ends of the fitting element and the solid collar are provided with matching grooves to receive a sealing ring 46 to block leakage of fluid pressure. The sealing ring is compressed against the tube. A flat type of sealing ring may be used between the fitting or coupling element and the solid collar, but the "O" type is preferable, since an annular metal-to-metal contact is provided between the coupling element and the solid collar to prevent crushing of the sealing ring. The compression nut 44 in Figure 9 is shorter than in the other views. The split collar 34 is compressed against the tube in the same manner as that described with other designs.

Figure 10:
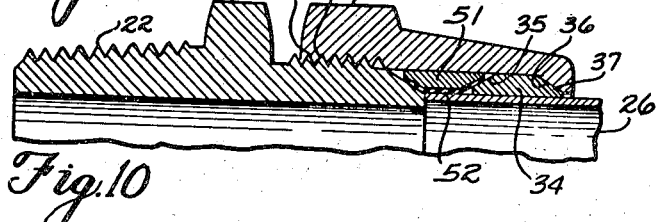

In Figure 10, the fitting element 41 is the same as that in Figure 7, but the inside surface and ends of the solid collar 51 are provided with a coating of resilient and deformable material 52 which makes a seal to block off the leakage of fluid pressure. The resilient and deformable coating 52 may be of a rubber-like material and may be bonded to the solid collar 51 of the coupling by dipping, molding or electro-depositing the same thereon, or by any other suitable method.

In Figure 11, I show a modified arrangement of my coupling device in that the fitting element 53 is provided at the right-hand end thereof with a cylindrical extension 54 against which the end of the pipe 26 abuts for making the joint 57. A solid overlapping collar 56 is arranged to have a ring seal 58 on one side of the joint 57 and a ring seal 59 on the other side of the joint. The two seals block off the escape of fluid pressure. In other words, there is no need of making a seal between the abutting surfaces of the solid collar and the external cam surface 55 of the fitting element 53. This escape of fluid pressure therebetween is blocked off by the sealing ring 58.

In Figure 12, I show a modified form of the invention over Figure 11 in that the solid overlapping collar 60 is provided with an elongated internal groove 61 having a sealing ring 62 therein having two end portions 63 and 64 disposed on opposite sides of the joint 57. The sealing ring may be in the form of an inverted-U so that each side of the joint is sealed against fluid pressure.

In Figure 13, I show another modified form of the solid overlapping collar 65 in that it is provided with an internal groove 66 and on each side thereof there is a seal 67 and 68 which may be anchored or applied directly to the metal of the overlapping collar. The sealing material may be of a rubber-like nature and may be provided thereon by dipping, molding or electro-deposition, or by any other suitable form.

The substantially parallel gripping of the tube by the split collar, which avoids the concentration of stress as would be the case if the split collar were cocked, enables my coupling to withstand a great deal of vibration. The engagement of the tube by the sealing rings also tends to absorb the vibration. The sealing rings are closely compressed on the tube and the clearance between the tube and the metal next adjacent the sealing rings is very small, making substantially a close slip fit. The sealing rings are thus prevented from extruding into the tight clearance even under high pressures. The clearance between the outer surface of the solid collar and the inner surface of the compression nut is small, whereby should the compression nut be jammed on too tight the solid collar may slightly expand and engage the inner surface of the compression nut, at which point the expansion is arrested before the yield point is reached. Upon loosening the compression nut, the solid collar contracts to its original position. In Figure 9, the right-hand end of the coupling or tube fitting element 43 may expand against the inner surface of the compression nut when the compression nut is jammed on too tight. When loosening the compression nut the expanded material contracts, whereby the compression nut may be easily and totally removed from the fitting element.

The drawings are drawn substantially to double scale for a one-half inch tube.

The split collar may be steel for both steel and aluminum alloy tubing. It may be provided with a hardened surface such as by chrome plating. Where the fluid pressures are not excessive the split collars may be made out of an aluminum alloy for use with aluminum alloy tubing.

In all forms of my invention, the cam surfaces between the compression nut and the split collar produces radial pressure against the tube incident to a longitudinal force tending to pull the tube away from the fitting element. The sealing rings being of yieldable and deformable material permits longitudinal movement of the tube therein, whereby the cam surfaces are free to function for setting up said radial pressure incident to the existence of said longitudinal force. With a flare on the end of the tube and with the tube compressed by cam surfaces at a remote place from the flare to absorb vibration, the cam surfaces are not free to function, since the flare tends to hold the tube against longitudinal pull or give and prevent a longitudinal force to exist between the cam compression device and the fitting element. Even though the compression nut may become slightly loose, my invention is still operative to hold and seal the tube, since a longitudinal force on the tube generates a greater gripping action as the pull in the tube is increased. For aluminum alloy tubing which is softer than steel tubing, my invention has particular utility since the softer tubing may tend to take a permanent compressed set under the split collar and thus under extreme conditions of vibration may become loose in the split collar. With a flare on the end of a tube where no give or slippage can take place unless the flare is ruptured, the tube may become permanently loose within the split collar. However, with my invention, the tube can give or slip within the seal, whereby the tubing may be slightly drawn back in the contracted split collar where a firm grip is always kept on the tube. The give or slippage necessary to make the split collar keep a firm grip on the tube is extremely slight because the cam surfaces are immediately brought into play upon the existence of a longitudinal force tending to pull the tube from the fitting element.

Under continual pull, the softer metal tubing may tend to grow, build-up or gather in advance of the split collar, whereby the presence of the collected material will give additional strength to the mechanical gripping action. Inasmuch as the sealing ring is in advance of the split collar the internal pressure of the fluid supports the tube internally as well as the support afforded by the body of the metal tubing itself. During the gathering stage, the tube may give or slightly slip longitudinally relative to the split collar. The gathered material will tend to flow into the small annular space in advance of the split collar. When the annular space is filled up the holding power of the split collar becomes increasingly greater. The gathering of the material as above described is made possible by reason of the fact that the sealing ring allows the tube to move longitudinally therein.

My invention has another advantage in that the rubber-like seal absorbs vibration from the tube and further, I have but a single means to engage the tube for holding same against longitudinal pull, and thus does not require a correct relationship between two or more fixedly disposed parts where the machining must be held to close tolerances.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A coupling device for attaching a tube to a fitting element having an abutting end surface, said device comprising a hollow member adapted to fit around the tube and having means to engage the fitting element for securing said member to said fitting element, a solid collar in the hollow member adapted to surround the tube and be directly pressed tightly against the abutting end surface of the fitting element, a split collar in the hollow member adapted to be contracted about the tube at a place remote from the end of the tube, said solid collar and split collar having abutting cam surfaces to contract the split collar against the tube, said hollow member engaging said split collar and forcing same against the solid collar, whereby the solid collar is tightly pressed against the abutting end surface of the fitting element to make a seal therebetween and whereby the split collar is forceably contracted about the tube to clamp same against longitudinal movement in the hollow member, and seal means between the solid collar and the tube.

2. A coupling device for attaching a tube to a fitting element having an end surface, a hollow compression nut threadably engaging the fitting element, a solid collar in the compression nut surrounding the tube and having one end directly engaging the end surface of the fitting element, a contractible cam ring in the compression nut surrounding the tube and abutting against the solid collar, the external surface of the contractible cam ring and the internal surface of the hollow compression nut having a cam surface to compress the contractible cam ring about the tube, and seal means between the solid collar and the tube to seal fluid pressure independently of any mechanical pressure incident to the anchoring of the compression nut, the solid collar and the cam ring to the fitting element.

3. A coupling device for attaching a tube to a fitting element having an abutting end surface, said device comprising a hollow member adapted to fit around the tube and having means to engage the fitting element for securing said member to said fitting element, a solid collar in the hollow member adapted to surround the tube and be directly pressed tightly against the abutting end surface of the fitting element, a split collar in the hollow member adapted to be contracted about the tube at a place remote from the end of the tube, said solid collar and split collar having abutting cam surfaces to contract the split collar against the tube, said hollow member engaging said split collar and forcing same against the solid collar, whereby the solid collar is tightly pressed against the abutting end surface of the fitting element to make a seal therebetween and whereby the split collar is forcibly contracted about the tube to clamp same against longitudinal movement in the hollow member, and seal means engaging the tube to block fluid pressure escaping from the coupling device.

4. A coupling device for attaching a tube to a threaded fitting element having an end and a bore extending from said end to communicate with said tube, means including a hollow compression nut and ring means mounted therein for anchoring and sealing the tube to the fitting element, said ring means including a split cam ring portion contractible about the tube and a seal ring portion closely surrounding the tube, said ring means and said end having annular opposed surfaces for resisting relative pressing forces between said ring means and the end of the fitting element, an internal annular groove having at least one wall in said seal ring portion extending outwardly from said tube, and seal means in said groove surrounding the tube to seal between the tube and the seal ring portion independently of any mechanical pressure incident to the anchoring of the compression nut and ring means to the fitting element.

GEORGE V. WOODLING.

REFERENCES CITED

The following references are of record in the file of this patent:

UNITED STATES PATENTS

| Number | Name | Date |
| --- | --- | --- |
| 268,162 | Bowen | Mar. 31, 1927 |
| 275,193 | Grannan | Apr. 3, 1883 |
| 1,694,822 | Kennedy | Dec. 11, 1928 |
| 2,326,929 | Cowles | Aug. 17, 1943 |
| 2,412,664 | Wolfram et al. | Dec. 17, 1946 |